United States Patent [19]

Ringer

[11] 3,747,108

[45] July 17, 1973

[54] REMOTE CONTROL SYSTEM

[75] Inventor: Kenneth M. Ringer, Longmont, Colo.

[73] Assignee: A. R. F. Products, Incorporated, Raton, N. Mex.

[22] Filed: Sept. 7, 1971

[21] Appl. No.: 178,376

Related U.S. Application Data

[63] Continuation of Ser. No. 840,806, July 10, 1969, which is a continuation-in-part of Ser. No. 749,746, Aug. 2, 1968.

[52] U.S. Cl. .................... 343/225, 325/37, 325/393, 340/171 R, 340/17 PF, 343/228

[51] Int. Cl. ........................................ H04b 7/00

[58] Field of Search ........................... 343/225, 228; 340/171 PF, 171, 164; 325/30, 67, 113, 145, 163, 320, 393, 37; 318/16; 332/14, 16, 16 T; 178/66 A; 331/113; 317/123 CD

[56] References Cited

UNITED STATES PATENTS 3,522,536 8/1970 Reynolds ........................ 343/228 X

*Primary Examiner*—John W. Caldwell
*Assistant Examiner*—Scott F. Partridge
*Attorney*—Marshall A. Burmeister et al.

[57] ABSTRACT

A transmitter includes an oscillator stage with one feedback circuit to sustain carrier-frequency oscillations, and another feedback circuit, in which a pair of capacitors are successively coupled across a transformer winding by a multivibrator circuit, to modulate the carrier signal between two different audio frequencies at a predetermined repetition rate. In a modified construction one of the tones can be changed to a third tone by switching an additional capacitor in parallel with one of the two capacitors. The receiver discriminator circuit includes a pair of frequency-selective channels for gating on a transistor in each channel. A capacitor is charged through the first transistor and discharged through the second to energize a relay winding if the alternation of transistor conduction is substantially at the predetermined repetition rate. The modified receiver construction includes a third frequency-selective channel, a third transistor, a second relay, and a diode gating circuit whereby the second relay is energized when the first and third tones are received.

30 Claims, 5 Drawing Figures

INVENTOR
KENNETH M. RINGER
By Burmeister, Palmatier & Hamby
Attorneys

REMOTE CONTROL SYSTEM

This application is a continuation of my co-pending application, Ser. No. 840,806, filed July 10, 1969, which was a continuation-in-part of my application, Ser. No. 749,746, filed Aug. 2, 1968.

Remote control systems find utility in applications such as the opening and closing of garage doors, tuner rotation for channel switching in television sets, guidance of scaled-down aircraft and ships, and related operations. In each of these arrangements it is mandatory to provide maximum reliability of system operation while at the same time maintaining a compact, economical system. High reliability has proved difficult to obtain with a control signal in or near the radio frequency spectrum because so many common objects produce spurious signals across a wide band of frequencies. One example of a source of spurious signals is the diathermy machine which has been determined to produce spurious signals across a very broad portion of the audio frequency spectrum.

It is therefore a primary consideration of the present invention to produce a remote control system of enhanced reliability without sacrificing economy and physical compactness.

A corollary consideration is the production of such a system with enhanced reliability by reason of requiring more than one audio frequency signal to "unlock" the operating circuit in the receiver.

Another salient consideration is the attainment of high reliability by insuring that the receiver operating circuit is only unlocked with receipt of the proper audio frequency signals which in addition are alternating at a predetermined repetition rate.

The receiver of the present invention is connected to operate a relay or other control unit upon receipt of a carrier signal modulated at first and second frequencies which alternate at a predetermined repetition rate. A conventional input circuit demodulates the received carrier signal to apply first and second signals to a discriminator circuit. A pair of semiconductor switches connected in the discriminator circuit are successively operated as the first and second input signals are received from the input circuit. Circuit means, which in a preferred embodiment is a capacitor, is coupled in the discriminator circuit such that the control unit is operated in response to alternate operation or conduction of the first and second semiconductor switches at the predetermined repetition rate. Means is also provided to apply a potential difference to the discriminator circuit to operate the control unit when the appropriately modulated carrier signal is received.

Enhanced reliability of the remote control system is obtained by incorporating the discriminator circuit in the receiver which insures the control unit will not be actuated unless appropriate keying signals are received. The key to unlock the discriminator circuit and produce the desired operation includes not only the receipt of at least two preassigned frequency signals but also alternation of these signals at a predetermined repetition rate. Many control channels can be made available by utilizing different combinations of the carrier frequency, the modulating frequencies, and the repetition rate. With the described arrangement a high degree of reliability of control unit operation is attained without requiring either a transmitter or receiver of undue complexity, expense or physical size.

The transmitter of the inventive system includes an oscillator circuit and a multivibrator circuit. The oscillator in a preferred embodiment includes a transistor having input, output and common elements, with a first feedback circuit coupled between the input and output elements to sustain oscillations at the carrier frequency. A second feedback circuit, which includes a variable impedance arrangement, is coupled between the common and input elements to sustain oscillations at a modulating audio frequency. The multivibrator circuit is connected to vary the effective value of the variable impedance arrangement at the predetermined repetition rate, thus to modulate the carrier signal with corresponding first and second audio frequency signals.

A modified construction involves a switching arrangement to change one of the impedances in the transmitter, so that first and third tones will be produced, rather than the first and second tones. The receiver involves first, second and third frequency-selective channels; first, second and third semiconductor switches; first and second control units; and a diode gating arrangement whereby the receipt of the first and second tones operates the first control unit, while the receipt of the first and third tones operates the second control unit.

THE DRAWINGS

In the several figures of the drawing like reference numerals identify like components, and in the drawing.

GENERAL SYSTEM ARRANGEMENT

Figure 1:
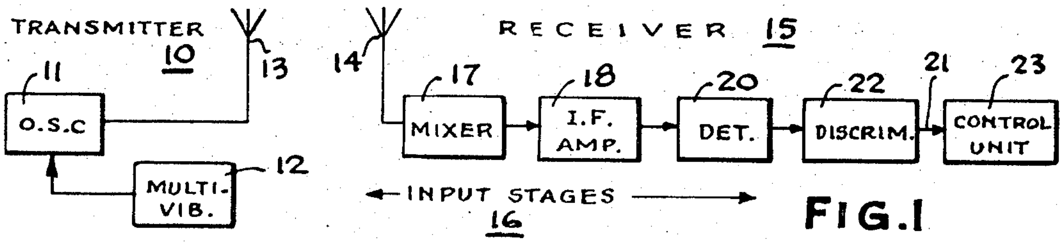
FIG. 1 is a block diagram of a remote control system constructed in accordance with the inventive principles.

FIG. 1 shows a transmitter 10 for providing a carrier signal modulated at first and second frequencies which alternate at a predetermined repetition rate. An oscillator stage 11 is connected so that its high frequency output signal is modulated between two different audio frequencies at a predetermined repetition rate established by the circuit constants in a multivibrator circuit 12. Accordingly, the modulated carrier signal is transmitted over an antenna 13, and a fraction of the radiated signal is received at the antenna 14 of a receiver 15.

For purposes of this explanation, receiver 15 is understood to include an input circuit 16 comprising conventional units such as mixer circuit 17, intermediate-frequency amplifier 18, and a second detector stage 20, in addition to antenna 14. Together these components are considered as an input circuit which receives the modulated carrier signal at antenna 14 and demodulates the received signal to provide, on line 21, signals at the modulation frequencies produced in transmitter 10. Responsive to a determination by a novel and unobvious discriminator 22 that the prescribed signals at the first and second modulation frequencies have been received, and further that such signals are alternating at the predetermined repetition rate, control unit 23 is operated to effect a desired controlled operation such as the opening or closing of a garage door or the rotation of a television tuner. Because the components described collectively as input circuit 16 are well known both in construction and operation to those skilled in this art, a more detailed explanation of these stages will not be set out in this description.

TRANSMITTER CIRCUIT

In FIG. 1, oscillator stage 11 includes an NPN transistor 30 having an input element or base **30*b*, an output element or collector 30*c*, and a common element or emitter 30e. A first feedback circuit is coupled through capacitor 31 between input element 30*b* and output element 30c for sustaining oscillations at the carrier frequency. Multivibrator circuit 12 includes a pair of active switching units 32, 33, shown as NPN type transistors connected in a known multivibrator or flip-flop configuration such that alternate conduction of the two switching units successively switches capacitors 34 and 35 across secondary winding 36 of a transformer 37. The transformer includes a primary winding 38 connected in a second feedback circuit coupled between common element 30*e* and input element 30*b* of oscillator 11 to effect alternate modulation of the carrier signal. The modulation frequencies are determined by the different capacitance values of capacitors 34, 35 and the repetition rate is predetermined by the values of the circuit components in multivibrator circuit 12.** Those skilled in the art will appreciate that certain substitutions can be made in the indicated arrangement without departing from the inventive concept or practice. By way of example the depicted NPN type transistors can be replaced by equivalent PNP type transistors, with a concomitant reversal of polarity of the applied energizing and signal voltages.

Considering now the circuit of transmitter 10 in more detail, the collector and base of oscillator transistor 30 may be considered analogous to the output and input elements of other equivalent switching devices, such as electron-discharge tubes. Likewise emitter 30e is a common element, and the cathode of an electron-discharge tube is also considered as a common element in the analogous circuit. Collector **30*c* is coupled through a tuned circuit 40, comprising an adjustable inductor 41 parallel-connected with a capacitor 42, and through a choke 43 to a first energizing conductor 44. Feedback capacitor 31 is coupled to the common connection between choke 43 and tuned circuit 40, and also coupled to the common connection between base 30b and a resistor 45. Resistor 45 is coupled to the common connection between voltage divider resistors 46 and 47 connected between first energizing conductor 44 and conductor 48.**

Emitter **30*e* is coupled through a resistor 52 to primary winding 38 of transformer 37. Multivibrator circuit 12 includes resistors 53–58 and capacitors 60 and 61 connected in a well known multivibrator or flip-flop configuration to provide successive conduction and non-conduction of active switching units 32 and 33 when an appropriate unidirectional potential difference is applied between first energizing conductor 44 and a second energizing conductor 62. When transistor 32 is conducting and transistor 33 is nonconducting, capacitor 34 is coupled across secondary winding 36 to reflect a certain impedance through the transformer into the second feedback circuit coupled to the base and emitter of oscillator stage 11, thus to modulate the transmitter carrier signal at a first audio modulation frequency. As transistor 33 is subsequently rendered conductive and switches off transistor 32 in a well known action, capacitor 34 is isolated from the modulation circuit and capacitor 35 is coupled across secondary winding 36 to modulate the transmitter output signal at a second audio frequency. The alternation rate of the modulation is dependent upon the circuit components 53–61 within multivibrator circuit 12. From another standpoint transformer 37, together with capacitors 34 and 35,** can be considered as a variable impedance arrangement coupled in the second feedback circuit of the oscillator, such that the multivibrator circuit varies the effective impedance value of this arrangement between first and second values at a predetermined repetition rate. Other types of transmitters can be utilized in connection with the receiver of this invention provided that the resultant carrier signal is modulated by at least two different frequencies alternating at a predetermined repetition rate.

DISCRIMINATOR CIRCUIT

Figure 3:
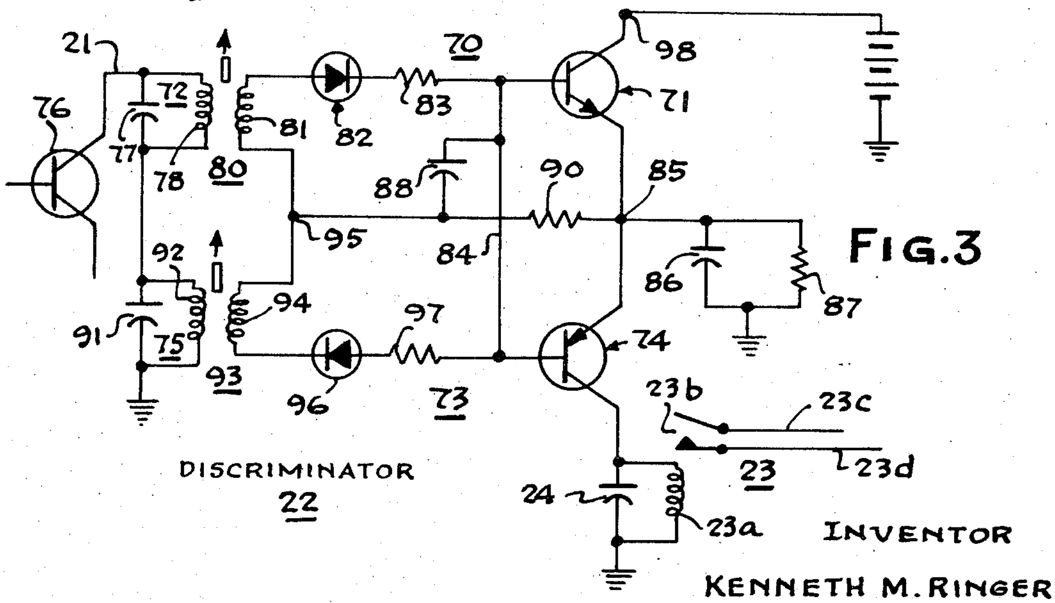
FIG. 3 is a schematic diagram of a discriminator circuit and control unit shown more generally in FIG. 1.

FIG. 3 depicts discriminator circuit 22 which includes a first channel 70 connected to operate a first semiconductor switch 71 upon passage of a first signal at one preassigned modulating frequency through tuned circuit 72, and a second channel 73 for operation of a second semiconductor switch 74 when a second signal at the other modulating frequency is passed through its tuned circuit 75. Successive operation of transistors 71, 74 at the predetermined repetition rate is effective to operate control unit 23, which for purposes of this explanation is shown as a relay having a winding **23*a* and a contact set 23*b* for transmitting a control signal over conductors 23*c*, and 23*d*** to any desired component when a properly modulated carrier signal is received.

An audio amplifier or isolation stage 76 is shown in FIG. 3 and may be considered a part of conventional input circuit 16, the details of which are not pertinent to an understanding of discriminator circuit 22 and operation of the invention. Tuned circuit 72 comprises a capacitor 77 parallel coupled with primary winding 78 of transformer 80, which includes a secondary winding 81. Circuit 72 is tuned to pass a signal only at the first of the two modulating frequencies determined by the circuit of transmitter 10. When a signal of this frequency is passed through the tuned circuit the voltage at the top of winding 81 is positive-going, to pass current through diode 82 and resistor 83 and thus gate on semiconductor switch 71, shown as an NPN type transistor. The base of transistor 71 is coupled to resistor 83 and also over conductor 84 to the base of PNP type transistor 74, and the emitters of these two semiconductor switches are connected in common at a common connection point 85. A parallel circuit comprising capacitor 86 and resistor 87 is coupled between point 85 and a plane of reference potential, commonly designated "ground." A series circuit comprising a capacitor 88 and a resistor 90 is connected in series between conductor 84 and common connection point 85.

The second channel in the receiver includes tuned circuit 75 comprising a capacitor 91 coupled in parallel with primary winding 92 of transformer 93, which includes a secondary winding 94. The upper end of winding 94 is connected to a common terminal 95, which is also connected to the lower end of secondary winding 81 and to the common connection between capacitor 88 and resistor 90. When a signal of the second modulating frequency passes through tuned circuit 75, a negative-going signal appears at the bottom of secondary winding 94 so that, through diode 96 and resistor 97, second transistor switch 74 is turned on. Terminal 98 is provided so that an energizing unidirectional potential difference can be applied between this terminal and ground to energize the discriminator circuit. A capacitor 24 is connected across relay winding 23a in conventional fashion.

When the demodulated signal at line 21 includes components at both the modulated audio frequencies, first and second signals are passed through both tuned circuits 72, 75 to gate on transistors 71, 74. It is evident that if both modulating signals are present simultaneously, voltages of opposite polarity appearing in the first and second channels will in effect cancel each other. Assuming that the modulating signals are received at the predetermined repetition rate, transistor 71 is gated on so that current flows from terminal 98 through the collector-emitter path of transistor 71 and through capacitor 86 to ground, to charge capacitor 86 during this portion of an operating cycle. Then, as the second signal of the second modulating frequency appears at line 21, transistor 71 is switched off and transistor 74 is gated on. This action completes a circuit which allows capacitor 86 to discharge, at least partially, through the emitter-collector path of transistor 74 and winding 23*a* of relay or control unit 23 to effect contact closure.

It is emphasized that to unlock the discriminator circuit and actuate relay 23, not only must the two selected frequency signals be received but in addition they must alternate at the predetermined repetition rate. If the repetition rate of the received signals is higher than the predetermined rate, the integrating effect of capacitor 88 will prevent operation of control unit 23. The time constant of the RC combination of 86, 87 is sufficiently short to preclude operation of the relay when the repetition rate of the received signal is significantly lower than the predetermined repetition rate.

Figure 2:
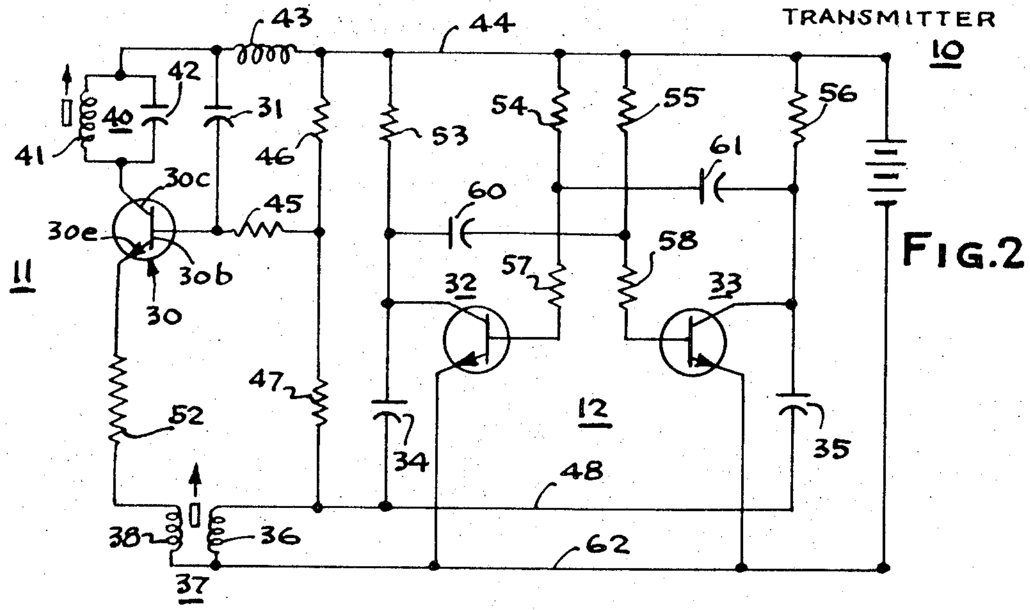
FIG. 2 is a schematic diagram of a transmitter circuit suitable for use in the system of FIG. 1.

In a preferred embodiment of the invention the transmitter circuit of FIG. 2 was operated with a d-c potential difference of 22.5 volts applied between first and second energizing conductors 44, 62, with the polarity of the voltage on conductor 44 being positive relative to that on the second energizing conductor 62. Thus conductors 44, 62 are considered means for energizing the transmitter in that the applied potential difference passes over these conductors to the transmitter components. Similarly, in FIG. 3, terminal 98 and the various points referenced by the ground symbol are considered as means for applying a potential difference to the discriminator circuit, with the potential at terminal 98 being 30 volts positive relative to ground.

Further to enable those skilled in the art to make and use the invention with a minimum of experimentation, the table below sets out typical circuit values suitable to produce a carrier signal alternating at 240 Megahertz, with modulating audio frequencies of 8 and 11 Kilohertz, and a predetermined repetition rate of 200 Hertz. For these operating values the circuit components were as follows:

Transmitter 10

| Component | Identification or Value |
|---|---|
| 30 | A415 |
| 32, 33 | 2N3860 |
| 42 | 2 picofarads |
| 31 | 10.0 picofarads |
| 34 | 0.017 microfarads |
| 60, 61 | 0.047 microfarads |
| 35 | 0.033 microfarads |
| 43 | 1.5 microhenries |
| 52 | 470 ohms |
| 45 | 3.3 kilohms |
| 46 | 47 kilohms |
| 47 | 2.2 kilohms |
| 53, 56 | 10 kilohms |
| 54, 55 | 100 kilohms |
| 57, 58 | 8.2 kilohms |
| Discriminator 22 | |
| 71 | T I S 98 |
| 74 | T I S 93 |
| 82 | IN 4148 |
| 96 | IN 4148 |
| 77 | .022 microfarads |
| 91 | .033 microfarads |
| 88 | 1.0 microfarads |
| 86 | 5.0 microfarads |
| 24 | 10.0 microfarads |
| 83 | 1.2 kilohms |
| 97 | 1.2 kilohms |
| 90 | 470 ohms |
| 87 | 5.6 kilohms |

Figures 4, 5:
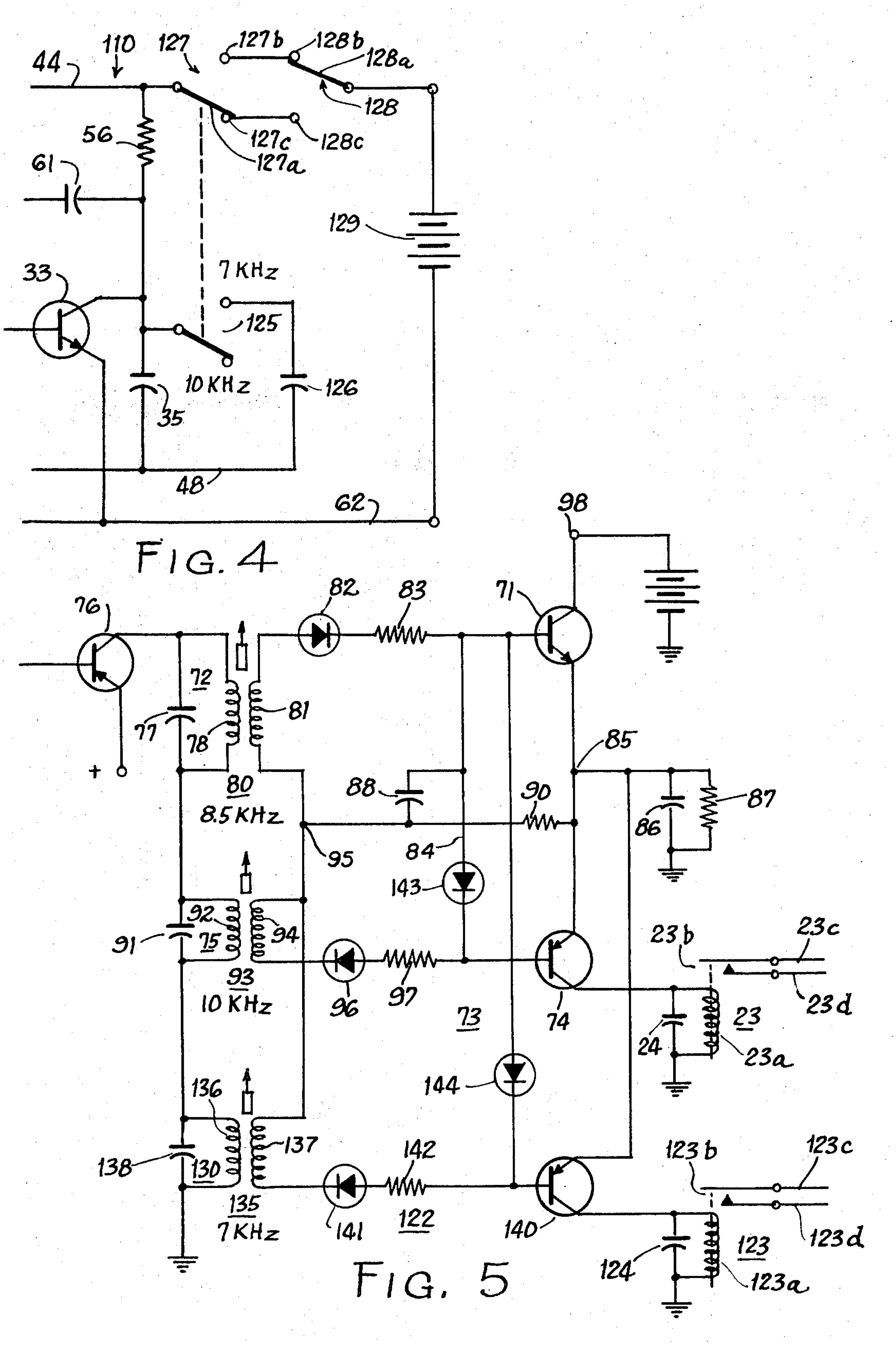
FIG. 4 is a fragmentary schematic diagram of a modified transmitter, similar to the transmitter of FIG. 2.
FIG. 5 is a schematic diagram of a modified discriminator and control unit, for use with the modified transmitter of FIG. 4.

FIGS. 4 and 5 illustrate a modified remote control system, whereby two separate and distinct functions can be controlled remotely, using only one transmitter and one receiver. This is in contrast to the system of FIGS. 1–3, whereby only one function can be controlled remotely. The system of FIGS. 4 and 5 can be used for many different remote control applications. For example, the system is well adapted for controlling the opening and closing of two separate and distinct garage doors.

FIG. 4 shows a fragment of the modified transmitter 110, while FIG. 5 shows a fragment of the modified receiver 115. The transmitter 110 is capable of transmitting a radio signal which is modulated with either of two different pairs of tones. Thus, for example, the tones of the first pair may be at 8.5 Kilohertz and 10 Kilohertz, while the tones of the second pair are at 8.5 Kilohertz and 7 Kilohertz. It will be understood that these frequencies are cited merely by way of example, and that many other combinations of frequencies may be employed. It is convenient to select the pairs of tones so that one tone is common to both pairs. This tone is the one at 8.5 Kilohertz in the above mentioned example.

As before, the receiver 115 of FIG. 5 is capable of demodulating the radio signal and separating the three tones. When the tones of the first pair are received alternately at the correct repetition rate, the first control unit 23 is operated, as in the case of the system of FIGS. 1–3. However, the receiver 115 incorporates a modified discriminator 122, constructed and arranged so that a second control unit 123 is actuated when the tones of the second pair are received alternately at the correct repetition rate.

The illustrated control unit 123 is in the form of a relay having a coil 123*a* and a pair of normally open contacts 123*b*. Output leads 123*c* and 123*d* are connected to the contacts 123*b*. A capacitor 124 is connected in parallel with the winding 123*a*.

The details of the modified transmitter 110 are shown in FIG. 4. The modified transmitter 110 is the same as the previously described transmitter 10 in most respects. However, instead of simply providing two fixed capacitors 34 and 35, provision is made for changing the capacitance in one of the capacitor circuits. As shown in FIG. 4, a switch 125 is provided for connecting a third capacitor 126 in parallel with the second capacitor 35. When both capacitors 35 and 126 are in the circuit, the frequency of the corresponding tone is reduced. Thus, in accordance with the previously mentioned example, the capacitor 35 may be of such a value as to produce a tone having a frequency of 10 Kilohertz. The frequency of the tone may be reduced to 7 Kilohertz when the capacitor 126 is switched in parallel with the capacitor 35.

In the embodiment of FIG. 4, a second switch 127 is ganged with the selector switch 125. The illustrated switch 127 comprises a contactor **127*a* which is movable between contacts 127*b*** and *c*. The contactor **127*a* engages the contact 127*b* when the selector switch 125 is closed. When the selector switch 125 is open, the contactor 127 engages the contact 127*c***.

The embodiment of FIG. 4 also includes an on-off switch 128 having a contactor **128*a* which is movable between contacts 128*b* and 128*c*. It will be seen that the contactor 128*a* is connected to the positive terminal of the power supply 129. The contacts 128*b*** and *c* are connected to the contacts **127*b*** and *c*.

The arrangement of the switches 125,127 and 128 is such that the transmitter 110 can be turned off by operating the switch 128. If the switches 125 and 127 are then reversed in position, the transmitter will be turned on, and the selection of the tones will be changed. For the closed position of the switch 125, tones of 7 Kilohertz and 8.5 Kilohertz are produced alternately at the repetition rate of the multivibrator 12. For the open position of the switch 125, tones of 8.5 Kilohertz and 10 Kilohertz are produced alternately. It will be realized that these particular frequencies are subject to change over a wide range and are mentioned merely by way of example.

The discriminator 122 of FIG. 5 is the same in most respects as the discriminator 22 of FIG. 3. Corresponding components have been given the same reference characters in FIG. 5 as in FIG. 3. In order to operate the additional relay 123, the discriminator 122 is provided with an additional tuned circuit 130, comprising a transformer 135 with primary and secondary windings 136 and 137. A capacitor 138 is connected in parallel with the primary winding 136, so as to tune the winding to the frequency of the third tone. Thus, in accordance with the previously mentioned example, the frequency selective circuit 130 may be tuned to 7 Kilohertz, while the first and second circutis 72 and 75 are tuned to 8.5 Kilohertz and 10 Kilohertz, respectively.

To actuate the second relay 123, the discriminator 122 is also provided with a third electronic switching device, preferably in the form of a transistor 140, similar to the transistor 74. The relay winding **123*a* is connected between the collector of the transistor 140 and ground. The emitter of the transistor 140 is connected in the same way as the emitter of the transistor 74, to the junction lead 85. Thus, the transistor 140 is adapted to discharge the capacitor 86 through the relay winding 123a, when the transistor 140** is conductive.

It will be seen that a diode 141 and a resistor 142 are connected in series between one side of the secondary winding 137 and the base of the transistor 140. The other or return side of the winding 137 is connected to the junction lead 95, the same as the return sides of the other secondary windings 81 and 94. The diode 141 is polarized so as to develop negative signal voltages on the base of the transistor 140.

To perform automatic switching or gating operations, the discriminator 122 is provided with two additional diodes 143 and 144. The diode 143 is connected in series with the lead 84, between the bases of the transistors 71 and 74. The diode 144 is connected between the bases of the transistors 71 and 140. Both diodes 143 and 144 are polarized so as to transmit positive signals from the base of the transistor 71 to the bases of the transistors 74 and 140.

When the first and second tones are being received, the relay 23 will be actuated. If, on the other hand, the first and third tones are being received alternately, the second relay 123 will be actuated.

The first tone, which may be at 8.5 Kilohertz, for example, is transmitted by the tuned transformer 80 and is rectified by the diode 82, so that a positive signal is produced on the base of the transistor 71. This positive signal causes the transistor 71 to be conductive, so that the capacitor 86 is charged from the power supply through the collector-emitter path of the transistor 71. The positive signal is transmitted by the diodes 143 and 144 to the bases of the transistors 74 and 140, so as to cause both of these transistors to be nonconductive.

When the second tone is being received, it is transmitted by the tuned transformer 93 and rectified by the diode 96 so as to produce a negative signal on the base of the transistor 74. This signal causes the transistor 74 to be conductive, so that the capacitor 86 is discharged through the transistor 74 and the relay winding 23a to ground. The diode 143 is effective to transmit the negative signal to the base of the transistor 71, so that it is rendered nonconductive. However, the diode 144 blocks the transmission of the negative signal to the base of the transistor 140 so that it remains nonconductive. The second tone may be at a frequency of 10 Kilohertz for example.

The third tone, which may be at a frequency of 7 Kilohertz, for example, is transmitted by the tuned transformer 135 and is rectified by the diode 141, so that a negative signal is applied to the base of the transistor 140. It is thereby rendered conductive so that the capacitor 86 will be discharged through the transistor 140 and the relay coil **123*a* to ground. The negative signal is transmitted by the diode 144 to the base of the transistor 71 so as to render it nonconductive. However, the diode 143 blocks the transmission of the negative signal to the base of the transistor 74**.

Thus, when the first and second tones are received alternately, the capacitor 86 is charged through the transistor 71 for the duration of the first tone, and then is discharged through the transistor 74, for the duration of the second tone. The relay 23 is thereby actuated. When the first and third tones are being received alternately, the capacitor 86 is alternately charged through the transistor 71 and discharged through the transistor 140 and the relay winding **123*a*. The relay 123** is thereby actuated.

This discussion presupposes that the tones are being alternated at the correct repetition rate. If the repetition rate is much too high, the integrating effect of the capacitor 88 will prevent operation of the relays 23 and 123. If the repetition rate is much too low, the capacitor 86 will be discharged sufficiently by the resistor 87 to prevent operation of the relays 23 and 123.

The relays 23 and 123 may be employed to operate opening motors for two different garage doors. This is only one example of the many applications for which the system of FIGS. 4 and 5 may be employed.

It will be understood by those skilled in the art that the values of the components for the embodiment of FIGS. 4 and 5 may be varied over a wide range to suit various conditions. However, it may be helpful to present one set of values which have been found to be satisfactory. The values and characteristics of the components for the embodiment of FIGS. 4 and 5 may be the same as previously given for the embodiment of FIGS. 1, 2 and 3, except as set forth in the following table. The values in the following table presuppose that the three tones are to be at 8.5, 10 and 7 Kilohertz, and that the repetition rate is to be at 150 Hertz:

| Component | Value or Type |
|---|---|
| 34 | .020 microfarads |
| 35 | .015 microfarads |
| 60, 61 | .1 microfarads |
| 124 | 10 microfarads |
| 126 | .015 microfarads |
| 140 | T I S 93 |
| 141, 143, 144 | IN 4148 |
| 142 | 1.2 kilohms |

Various other modifications, alternative constructions and equivalents may be employed, as will be understood by those skilled in the art.

I claim:

1. A receiver operable in response to receipt of a carrier signal modulated alternately with first and second modulation frequencies,
comprising an input circuit connected to demodulate the received carrier signal and provide first and second control signals related to the first and second modulation frequencies,
said control signals being opposite in polarity,
first and second transistors having respective bases, emitters and collectors,
one of said transistors being of the PNP type while the other is of the NPN type,
said input circuit including means for supplying both of said control signals to the bases of both of said transistors in common,
one of said control signals being effective to render said first transistor conductive while rendering said second transistor nonconductive,
the other control signal being effective to render said second transistor conductive while rendering said first transistor nonconductive,
an output circuit connecting the emitter-collector paths of said transistors in series,
said output circuit including a common connection between said transistors,
a power supply connected into said output circuit,
a control unit connected into said output circuit,
and an energy storage capacitor connected to said common connection and arranged for charging through one transistor and discharging through the other transistor and said control unit.

2. A receiver according to claim 1,
in which said common connection extends between the emitters of said transistors.

3. A receiver according to claim 1,
in which said input circuit includes integrating means to prevent operation of said control unit when the repetition rate at which said modulation signals are alternately received is substantially higher than the nominal repetition rate.

4. A receiver according to claim 3,
in which said input circuit includes a common reference point,
said integrating means including an integrating capacitor connected between said common reference point and the bases of said transistors.

5. A receiver according to claim 4,
in which said integrating means comprises first and second input resistors for supplying said first and second control signals to said bases of said transistors.

6. A receiver according to claim 5,
in which said input circuit comprises first and second input diodes for supplying said control signals to said first and second input resistors,
said input diodes being oppositely polarized.

7. A receiver according to claim 4,
including a resistor connected between said common reference point and said common connection between said transistors.

8. A receiver operable in response to receipt of a carrier signal modulated cyclically with a plurality of modulation signals at different frequencies,
comprising an input circuit connected to demodulate the received carrier signal and provide first and second control signals related to modulation signals at first and second frequencies,
said control signals being opposite in polarity,
first and second transistors having respective input and output electrodes,
one of said transistors being of the PNP type while the other is of the NPN type,
said input circuit including means for supplying said first and second control signals to the input electrodes of both of said transistors in common,
one of said control signals being effective to render said first transistor conductive while rendering said second transistor nonconductive,
the other control signal being effective to render said second transistor conductive while rendering said first transistor nonconductve,
an output circuit connecting the output electrodes of said transistors in series,
said output circut including a common connection between said transistors,
a power supply connected into said output circuit,
a control device connected into said output circuit,
and an energy storage capacitor connected to said common connection and arranged for charging through the first transistor and discharging through the second transistor and said control device.

9. A receiver according to claim 8,
including a third transistor having input and output electrodes,
said third transistor being of the same type as said second transistor,
said input circuit including means for producing a third control signal related to a modulation signal at a third frequency,
said input circuit being constructed and arranged to supply said first and third control signals to the input electrodes of said first and third transistors in common,
an additional control device, and an additional output circuit connecting said additional control device and said output electrodes of said third transistor to said common connection.

10. A receiver according to claim 9, in which said input circuit includes isolating diodes connected between the input electrode of said first transisor and the input electrodes of said second and third transistors.

11. A receiver according to claim 8, in which said input circuit includes integrating means for supplying the control signals to the input electrodes of said transistors.

12. A receiver according to claim 11, in which said integrating means includes a series resistor and a shunt capacitor connected to the input electrode of each transistor.

13. A receiver according to claim 8, in which said output circuit includes a resistor shunted across said energy storage capacitor.

14. A receiver for a remote control system utilizing a transmitted radio signal modulated with sequences of different tone signals, comprising means for receiving and demodulating the radio signal to reproduce sequences of received tone signals, at least three frequency selective circuits for separating three different tone signals, first and second remote control output means, an energy storage capacitor, first means operable by the first of said received tone signals for charging said capacitor, second means operable subsequently by a second of said received tone signals for discharging said capacitor into said first output means and thereby actuating said first output means, the receipt of said first and second tone signals thereby causing actuation of said first output means, and third means operable by a third of said tone signals for discharging said capacitor into said second output means and thereby actuating said second output means, the receipt of said first and third tone signals thereby causing actuation of said second output means.

15. A receiver according to claim 14, in which said first and second remote control output means include first and second relays.

16. A receiver according to claim 14, in which said first, second and third means comprise first, second and third electronic switch elements.

17. A receiver operable in response to receipt of a carrier signal modulated cyclically with a plurality of modulation signals at different frequencies, comprising an input circuit connected to demodulate the received carrier signal and provide first and second control signals related to modulation signals at first and second frequencies, said control signals being opposite in polarity, first and second semiconductor means having respective input and output electrodes, one of said semiconductor means being of the type rendered conductive by a positive input while the other is of the type rendered conductive by a negative input, said input circuit including means for supplying said first and second control signals to the input electrodes of both of said semiconductor means in common, one of said control signals being effective to render said first semiconductor means conductive while rendering said second semiconductor means nonconductive, the other control signal being effective to render said second semiconductor means conductive while rendering said first semiconducor means nonconductive, an output circuit connecting the output electrodes of said semiconductor means in series, said output circuit including a common connection between said semiconductor means, a power supply connected into said output circuit, a control device connected into said output circuit, and an energy storage capacitor connected to said common connection and arranged for charging through the first semiconductor means and discharging through the second semiconductor means and said control device.

18. A remote control system, comprising a transmitter including a carrier oscillator for producing a radio frequency carrier signal, modulation oscillation means for modulating said carrier signal with modulation frequency signals in the high audio frequency range, pulse generator means for producing repetitive pulses at a predetermined repetition rate corresponding to the low audio frequency range, means connected to said pulse generator means and operable by said pulses for repetitively changing the frequency of said modulation frequency signals between first and second substantially different modulation frequencies in the high audio range, a receiver including an input circuit for receiving and demodulating said carrier signal to produce first and second repetitively alternating tone signals at the first and second different modulation frequencies, first means operable by one of said tone signals for producing positive control pulses, second means operable by the other tone signal for producing negative control pulses, an integrating capacitor, charging means connected from said first and second means to said integrating capacitor for charging said capacitor with said positive and negative control pulses, first and second electronic switching means having respective control input electrodes connected in common to said integrating capacitor, an energy storage capacitor, an output control device, first output means connecting said first electronic switching means to said energy storage capacitor for charging said energy storage capacitor through said first electronic switching means in response to integrated pulses of one polarity across said integrating capacitor, and second output means for connecting said second electronic switching means between said energy storage capacitor and said output control device for discharging said energy storage capacitor into said output control device in response to integrated pulses of the opposite polarity across said integrating capacitor, said integrating capacitor preventing actuation of said output control device in response to tone signals alternating at a repetition rate substantially greater than the predetermined repetition rate.

19. A system according to claim 18, including a discharging resistor connected to said energy storage capacitor to prevent operation of said output control device in response to tone signals having a repetition rate substantially less than the predetermined repetition rate.

20. A receiver operable in response to receipt of a carrier signal modulated alternately with first and second modulation frequencies, comprising an input circuit connected to demodulate the received carrier signal and including first and second control signal output circuits providing first and second unidirectional control signals related to the first and second modulation frequencies, first and second transistors having respective bases, emitters and collectors, said input circuit including means for connecting the first control output circuit to the bases and emitters of both transistors with one polarity while connecting the second control output circuit to the bases and emitters of both transistors with the opposite polarity, one of said control signals being effective to render said first transistor conductive while rendering said second transistor nonconductive, the other control signal being effective to render said second transistor conductive while rendering said first transistor nonconductive, a utilization device, and output means connected to the emitter-collector paths of both transistors for operating said utilization device in response to alternate intervals of conduction in said first and second transistors.

21. A receiver according to claim 20, in which said input circuit includes integrating means to prevent operation of said utilization device when the repetition rate at which said modulation signals are alternately received is substantially higher than the nominal repetition rate.

22. A receiver according to claim 20, in which one of said transistors is of the PNP type while the other transistor is of the NPN type.

23. A receiver operable in respose to receipt of a carrier signal modulated cyclically with a plurality of modulation signals at different frequencies, comprising input circuit means connected to demodulate the received carrier signal and including first and second control signal output circuits for producing first and second unidirectional control signals related to modulation signals at first and second frequencies, first and second transistors having respective input and output circuits, said input circuit means including means for connecting said first control signal output circuit to the input circuits of both transistors with one polarity while connecting said second control signal output circuit to the input circuits of both transistors with the opposite polarity, one of said control signals being effective to render said first transistor conductive while rendering said second transistor nonconductive, the other control signal being effective to render said second transistor conductive while rendering said first transistor nonconductive, a utilization device, and output means connected to the output circuits of both transistors for actuating said utilization device in response to conduction of said first and second transistors in a predetermined sequence.

24. A receiver according to claim 23, in which one of said transistors is of the positive-negative type while the other transistor is of the negative-positive type.

25. A receiver according to claim 23, including a third transistor having input and output circuits, said input circuit means including a third control signal output circuit for producing a third unidirectional control signal related to a modulation signal at a third frequency, said input circuit means including means for connecting said first control signal output circuit to the input circuits of said first and third transistors with one polarity while connecting said third control signal output circuit to the input circuits of said first and third transistors with the opposite polarity, an additional utilization device, and additional output means connected to the output circuits of said first and third transistors for actuating said additional utilization device in response to conduction of said first and third transistors in a predetermined sequence.

26. A receiver according to claim 25, in which said input circuit means includes isolating diodes connected between the input circuit of said first transistor and input circuits of said second and third transistors.

27. A receiver according to claim 23, in which said input circuit means includes integrating means for supplying the control signals to the input circuits of said transistors.

28. A receiver according to claim 27, in which said integrating means includes a series resistor and a shunt capacitor connected to the input circuit of each transistor.

29. A receiver operable in response to receipt of a carrier signal modulated cyclically wth a plurality of modulation signals at different frequencies, comprising input circuit means connected to demodulate the received carrier signal and including first and second control signal output circuits to provide first and second unidirectional control signals related to modulation signals at first and second frequencies, first and second semiconductor means having respective input and output circuits, said input circuit means including means for connecting said first control signal output circuit to the input circuits of both semiconductor means with one polarity while connecting said second control signal output circuit to the input circuits of both semiconductor means with the opposite polarity, one of said control signals being effective to render said first semiconductor means conductive while rendering said second semiconductor means nonconductive, the other control signal being effective to render said second semiconductor means conductive while rendering said first semiconductor means nonconductive,
a utilization device,
and output means connected to the output circuits of both semiconductor means for actuating said utilization device in response to conduction of said first and second semiconductor means in a predetermined sequence.

30. A receiver according to claim 29,
in which one of said semiconductor means is of the type rendered conductive by a positive input while the other semiconductor means is of the type rendered conductive by a negative input.

* * * * *

PO-1050
(5/69)

UNITED STATES PATENT OFFICE

CERTIFICATE OF CORRECTION

Patent No. 3,747,108 Dated July 17, 1973

Inventor(s) Kenneth M. Ringer

It is certified that error appears in the above-identified patent and that said Letters Patent are hereby corrected as shown below:

Column 1, line 2, after "July 10, 1969" insert -- now abandoned--

Column 1, line 4, after "August 2, 1968" insert --now abandoned--

Column 12, Claim 18, delete.

Column 13, Claim 19, delete.

Signed and sealed this 25th day of December 1973.

(SEAL)
Attest:

EDWARD M.FLETCHER,JR.
Attesting Officer

RENE D. TEGTMEYER
Acting Commissioner of Patents